April 10, 1951     J. D. KLEIS ET AL     2,547,947
CONTACT ASSEMBLY
Filed June 17, 1946
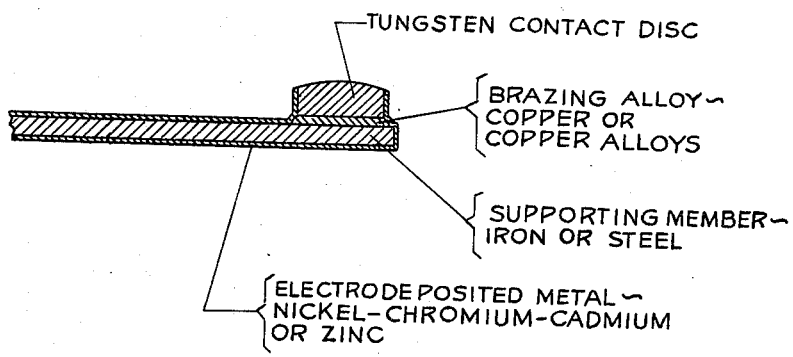
Gilbert Halverson
John D. Kleis
      INVENTORS
BY *George F. Mueller*
      ATTORNEY Patented Apr. 10, 1951

2,547,947

UNITED STATES PATENT OFFICE 2,547,947

CONTACT ASSEMBLY

John D. Kleis, Lake Forest, and Gilbert Halverson, Libertyville, Ill., assignors to Fansteel Metallurgical Corporation, North Chicago, Ill., a corporation of New York Application June 17, 1946, Serial No. 677,204

5 Claims. (Cl. 200—166)

1

This invention relates to electrical contact assemblies and to the method of making the contact assemblies, particularly assemblies of tungsten contact discs mounted upon iron or steel backing or supporting members.

Electrical contact units for ignition systems of internal combustion engines generally consist of two parts. The stationary contact assembly consists of a screw having a tungsten contact disc brazed or welded to one end of screw. The movable contact assembly consists of a steel or iron breaker arm to which has been welded or brazed a tungsten contact disc. These assemblies are generally made by placing a thin wafer of copper or a copper alloy brazing material upon the breaker arm or iron supporting member and then placing the tungsten disc over the wafer of brazing material. The assembly is placed in a jig and heated to the required brazing temperature for the particular brazing material employed.

The tungsten contact points of these assemblies, when allowed to remain idle, become dirty and covered with a dark colored film or growth. This is particularly noticeable when the assemblies are held in a warm, humid atmosphere. The deposit of dark colored material begins on the side of the tungsten disc adjacent the junction between the disc and the brazing material. This deposit continues to advance or grow on the sides of the tungsten disc toward the face of the disc and then gradually creeps or continues over the face of the disc. After only two or three days in a warm, humid atmosphere the entire surface of the tungsten disc may be covered with the dark deposit which in appearance resembles cobwebs or molds. In the first stages of the formation of this deposit, the film first appears amber in color and as the thickness increases it becomes almost black in color. In the early stages of the formation of this deposit, the material is flaky and brittle and in physical properties resembles dried varnish. The thickness of the deposit is greater adjacent the brazing junction and gradually decreases in thickness with an increase in the distance from the brazing junction to the center of the contact face.

The deposit is brittle and may be removed by scraping. It has a relatively high electrical resistance and thereby materially impairs the characteristics of the electrical contacts, a very thin film being sufficient to cause an open circuit at the usual automotive ignition system voltage. It is also quite brittle and in actual use small portions will become chipped and broken off, further

2 adding to the difficulties in the use of the contact assemblies.

One of the objects of this invention is to provide a method of making contact assemblies consisting of an iron or steel backing or supporting member and a tungsten contact element whereby the formation of the dark colored deposit on the tungsten contact member is eliminated.

A further object of this invention is to provide a contact assembly which may be stored in a warm, humid atmosphere without the formation of this characteristic dark colored deposit.

Other objects and advantages of the invention will become apparent from the detailed description and claims which follow.

It has been discovered that the formation of the dark colored deposit on the edges and over the face of the tungsten contact disc may be eliminated by nickel plating, chromium plating, cadmium plating or zinc plating the contact assemblies. In making the contact assemblies the conventional steps are used; that is, a brazing wafer consisting of copper or a copper alloy is placed on the iron or steel backing member, the tungsten contact disc is positioned on the brazing wafer and the assembly is heated to the required temperature for the particular brazing material employed. The completed assembly is then plated with nickel, chromium, cadmium or zinc in accordance with conventional plating practice. After the plating operation, the contact face and the edges of the contact disc, particularly the edges adjacent the face, are polished to remove the plated metal from these surface portions of the tungsten.

The drawing illustrates an electrical contact assembly made in accordance with this invention. As shown, the assembly consists of a ferrous supporting member to which has been secured a tungsten contact disc by the use of a brazing wafer of the conventional type, consisting of copper or copper alloys. After the brazing operation, the entire assembly is plated with the protective metal with the exception of the face of the contact disc. If some of the metal becomes deposited on the tungsten contact face, it is removed by a grinding and polishing operation.

Assemblies made in accordance with this invention may be allowed to remain idle for several years in warm, humid atmospheres without the production of the dark colored, mold like deposit.

To illustrate the effectiveness of assemblies made in accordance with this invention, representative ignition system assemblies were made in accordance with conventional practice in which a copper alloy material was used as the brazing material. One group of these assemblies was nickel plated and the contact faces and edges were polished to remove the nickel plating. Another group was cadmium plated and the contact faces and edges were polished to remove the cadmium. Both groups of assemblies along with a group of conventional assemblies were then supported in a closed jar above water to insure a moist atmosphere, the jar being maintained at room temperatures. The assemblies included steel screws having mounted at one end a tungsten contact disc and steel breaker arms upon which had been mounted tungsten contact discs.

At the end of five days the assemblies were carefully inspected. The conventional assemblies had a considerable amount of the dark colored deposit upon the sides of the tungsten discs. The dark deposit had not yet begun to creep or grow across the face of the discs. The assemblies made in accordance with the present invention had substantially the same appearance as when placed in the moist atmosphere.

A further inspection of these assemblies was made at the end of four weeks. In most of the assemblies made in accordance with the usual practice the dark colored deposit had crept around and over the face of the tungsten contact. In some instances rather large globules of the deposit covered the surface of the tungsten disc. This deposit has an extremely high electrical resistance and the presence of only a very thin film of the deposit is sufficient to cause contact failure. Assemblies made in accordance with this invention appeared to be in substantially the same condition as when they were placed in the jar at the beginning of the test. The surfaces of the tungsten discs were clean and exhibited merely a very slight coloration.

Assemblies made in accordance with our invention are in substantially their original condition although they have been maintained in the warm, humid atmosphere for a period of about one year. The contact surfaces exhibit only a slight discoloration, but these surfaces and the contact edges are entirely free of the usual dark colored deposit.

It is obvious that various modifications will suggest themselves to those skilled in the art. In the method described, the contact face becomes coated with the plating metal. This method may be modified by coating the contact face, before plating, with a non-conducting material such as a wax, grease, lacquer and the like so as to prevent the deposition of the metal on the contact face. This non-conducting material is then removed after the assembly has been plated. In p'ace of heating the entire assembly to a temperature at which the brazing material melts or fuses, other common well known methods may be employed wherein only the contact disc, the brazing wafer and that portion of the supporting member underlying the contact disc are heated such as heating by induction, resistance welding and the like.

The term "iron" is used herein and in the claims in a generic sense to include steels.

I claim:

1. An electrical ignition system contact assembly resistant to the action of warm, humid atmospheres comprising an iron supporting member, a tungsten contact element brazed to the supporting member and an electrodeposited coating of a metal selected from the group consisting of nickel, cadmium, zinc and chromium covering the supporting member, the brazed junction and the edge portions of the contact element adjacent the junction.

2. An electrical ignition system contact assembly resistant to the action of warm, humid atmospheres comprising an iron supporting member, a tungsten contact member brazed to the supporting member and an electrodeposited layer of nickel covering the supporting member, the brazed junction and the edge portions of the contact member adjacent the junction.

3. An electrical ignition system contact assembly resistant to the action of warm, humid atmospheres comprising an iron supporting member, a tungsten contact member brazed to the supporting member and an electrodeposited layer of cadmium covering the supporting member, the brazed junction and the edge portions of the contact member adjacent the junction.

4. An electrical ignition system contact assembly resistant to the action of warm, humid atmospheres comprising an iron supporting member, a tungsten contact member brazed to the supporting member and an electrodeposited layer of zinc covering the supporting member, the brazed junction and the edge portions of the contact member adjacent the junction.

5. An electrical ignition system contact assembly resistant to the action of warm, humid atmospheres comprising an iron supporting member, a tungsten contact member brazed to the supporting member and an electrodeposited layer of chromium covering the supporting member, the brazed junction and the edge portions of the contact member adjacent the junction.

JOHN D. KLEIS.
GILBERT HALVERSON.

REFERENCES CITED

The following references are of record in the file of this patent:

UNITED STATES PATENTS

| Number | Name | Date |
|---|---|---|
| 1,089,907 | Coolidge | Mar. 10, 1914 |
| 1,236,523 | Williams | Aug. 14, 1917 |
| 1,264,685 | Rignon | Apr. 30, 1918 |
| 2,216,654 | Seubert | Oct. 1, 1940 |
| 2,315,740 | Schoonmaker | Apr. 6, 1943 |
| 2,419,231 | Schantz | Apr. 22, 1947 |

FOREIGN PATENTS

| Number | Country | Date |
|---|---|---|
| 498,193 | France | Oct. 9, 1919 |